(12) United States Patent
Ogawa

(10) Patent No.: US 6,660,217 B2
(45) Date of Patent: Dec. 9, 2003

(54) BLOW MOLDING METHOD

(75) Inventor: Masaaki Ogawa, Hyogo (JP)

(73) Assignee: Tigers Polymer Corporation, Toyonaka (JP)

( * ) Notice: Subject to any disclaimer, the term of this patent is extended or adjusted under 35 U.S.C. 154(b) by 334 days.

(21) Appl. No.: 09/867,539

(22) Filed: May 31, 2001

(65) Prior Publication Data
US 2002/0113341 A1 Aug. 22, 2002

(30) Foreign Application Priority Data
Feb. 16, 2001 (JP) ........................... 2001-040035

(51) Int. Cl.<sup>7</sup> ............................................. B29C 49/50
(52) U.S. Cl. ........................... 264/536; 425/527
(58) Field of Search ........................... 264/536; 425/527

(56) References Cited

U.S. PATENT DOCUMENTS

| 2,541,249 A | 2/1951 | Hobson |
| 3,142,089 A | 7/1964 | Wilkalis et al. |
| 3,892,513 A | 7/1975 | Mehnert et al. |
| 4,419,063 A | 12/1983 | Heise |
| 5,480,607 A | 1/1996 | Hobson et al. |
| 5,617,768 A | * 4/1997 | Palazzolo ................ 82/47 |
| 6,228,317 B1 | * 5/2001 | Smith et al. ............ 264/521 |

FOREIGN PATENT DOCUMENTS

| DE | 1 604 578 | 4/1970 |
| DE | 19 20 303 | 11/1970 |
| DE | 24 35 843 | 2/1976 |
| JP | 09-262902 | 10/1997 |

* cited by examiner

Primary Examiner—Suzanne E. McDowell
(74) Attorney, Agent, or Firm—Oblon, Spivak, McClelland, Maier & Neustadt, P.C.

(57) ABSTRACT

A blow molding method for forming a hollow resin product comprises a parison extruding step, a protrusion abutting step and a confronting rod abutting step. In the extruding step, a parison is extruded from a die head towards a position interposed between a pair of molding portions. Each molding portion has a mating surface and a parison-cutting-protrusion erected from the mating surface. In the protrusion abutting step, the protrusions are abutted from each other. In the confronting rod abutting step, the spherical surfaces formed at tip ends of the rods protruded from the mating surfaces of the molding portions are abutted from each other. These steps are simultaneously executed, to thereby remove a flash from a product when the molding portions are closed. In addition to this, the rods mounted on one of molding portions are mounted on the same so as to be adjustable in its protruding length from the mating surface.

7 Claims, 7 Drawing Sheets

6a

6b

BLOW MOLDING METHOD

BACKGROUND OF THE INVENTION

The present invention relates to a blow molding method of forming a hollow product made of resin through a parison, and particularly relates to a blow molding method of removing a flash from the product in a molding operation thereof.

In a conventional blow molding method for forming a hollow product made of resin through a tube-shaped parison, the hollow product is usually formed as follows. At first, the tube-shaped parison made of melted resin is extruded from a die head towards a position between a pair of split molding portions. After tightly closing the molding portions, a high-pressure air is blown into a hollow portion of the parison so as to inflate the parison. Then the parison is reformed in a specified form based on a cavity defined by the tightenly closed molding portions. The thus reformed parison is cooled and solidified within the cavity, to thereby form a molded resin product. In addition to this, a flash which is generated by the remaining parison around the molded resin product must be removed in order to obtain a complete product.

However, the removing operation of the flash is implemented by hand generally. Since the operation is very complicated, it increases manufactured cost thereof. Further, such successively and repetitiously flash removing operation cause to raise a risk of worker's accident.

SUMMARY OF THE INVENTION

It is an object of the present invention to provide a blow molding method which can eliminate a flash removing operation.

The above-mentioned object can be achieved by a blow molding method for forming a hollow resin product, according to the present invention, comprising the steps of:

extruding a parison from a die head towards a position interposed between first and second molding portions, wherein the first molding portion has a first mating surface and a first annular-shaped parison-cutting-protrusion erected from the first mating surface, and the second molding portion has a second mating surface and a second annular-shaped parison-cutting-protrusion erected from the second mating surface;

abutting the first and second annular-shaped parison-cutting-protrusions while closing the first and second molding portions tightly, thereby defining a molding chamber by the first and second annular-shaped parison-cutting-protrusions; and abutting a plurality of first confronting rods with a plurality of second confronting rods respectively at the same time of the abutting step of the first and second annular-shaped parison-cutting-protrusions, wherein the first confronting rods are protruded from the first mating surface of the first molding portion and disposed outside the first annular-shaped parison-cutting-protrusion in a radial direction of the first molding portion, and the second confronting rods are protruded from the second mating surface of the second molding portion and disposed outside the second annular-shaped parison-cutting-protrusion in a radial direction of the second molding portion.

In the above-mentioned blow molding method, it is preferable that the method further comprises the step of adjusting a length of at least one of first and second confronting rods, the length protruding from the respective mating surface.

In the blow molding method according to the present invention, when the molding portions are tightly closed, not only the first and second parison-cutting-protrusions but also the first and second confronting rods are respectively and simultaneously brought in contact with one another. The protrusions of the mating face are abutting at the same time of abutting a plurality of confronting rods proposed in the periphery of the mating surface of the molding portion. That is, the first and second annular-shaped parison-cutting-protrusions are positioned in such a manner that they are brought in contact with each other at the same time of abutting the confronting rods. Therefore, even if the first and second annular-shaped parison-cutting-protrusions are so edged as to cut the parison, no impact strength in the molding portion closing operation concentrates on such edged protrusions, because dispersion of impact strength toward the confronting rod on the molding portions prevents the edged protrusions from breaking out.

In the blow molding method according to the present invention, it is preferable that each of the first and second confronting rods has a curved surface at its tip end.

With this feature, even if the first and second confronting rods pinch the high-temperature molten parison with pressure, the parison is very easily floating away along the curved surface. Therefore, the first and second confronting rods completely can be brought into contact with each other, even if the confronting rods pinch the high-temperature molten parison.

In the blow molding method according to the present invention, the tip ends of the first and second annular-shaped parison-cutting-protrusions are brought in contact with each other completely and entirely in its circumferential direction without any clearance, so that the prison can be completely decoupled with a flash which are formed outside in the periphery of the protrusions.

BRIEF DESCRIPTION OF THE DRAWINGS

The present invention is now described in detail with reference to the accompanying drawings.

DETAILED DESCRIPTION OF THE PREFERRED EMBODIMENTS

Hereinafter a blow molding method according to one preferred embodiment according to the present invention will be explained.

Figure 1:
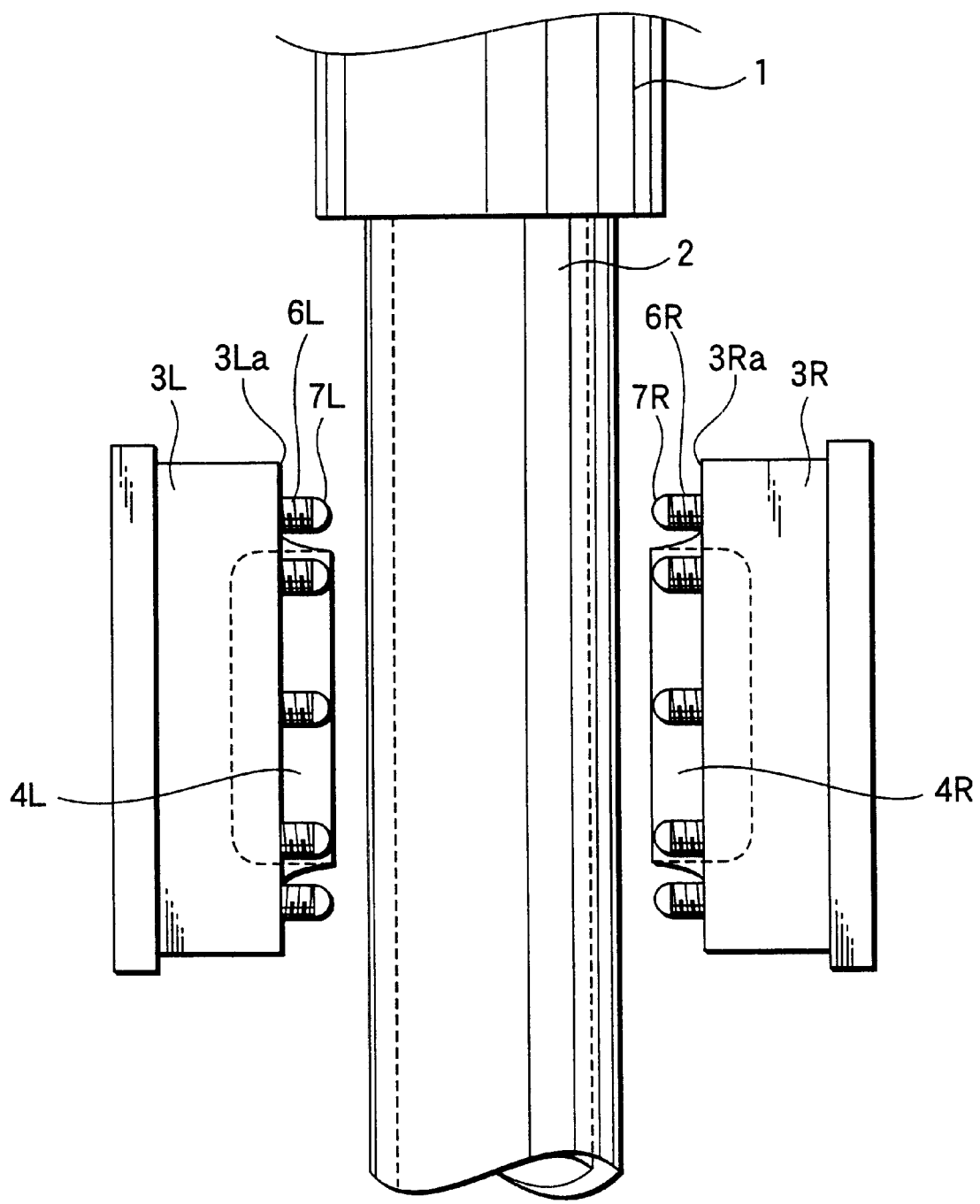
FIG. 1 is a side view showing an extrusion of a parison between molding portions in an opening condition.
Figure 3:
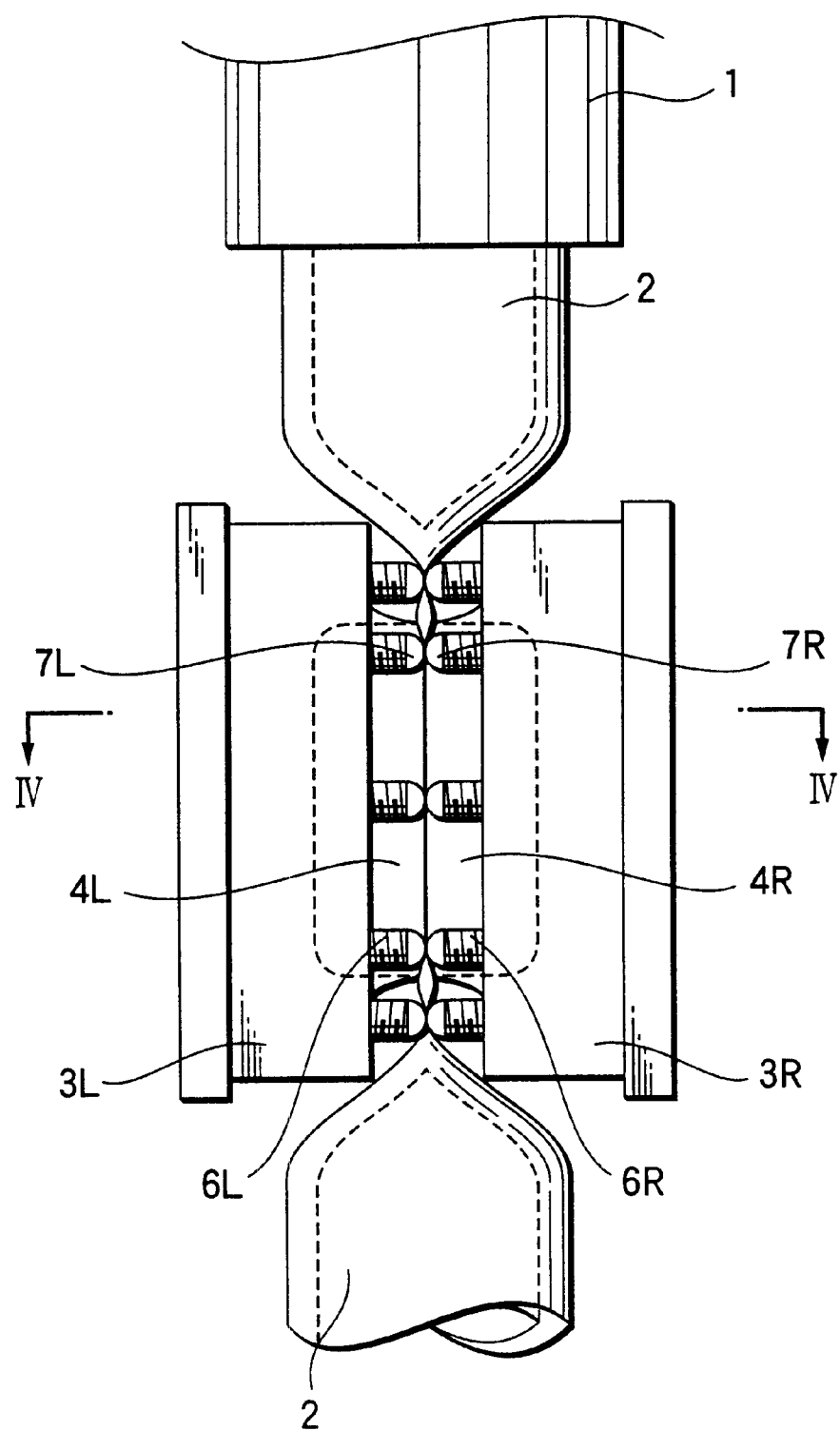
FIG. 3 is a side view showing the molding portion in a closing condition.

As shown in FIGS. 1 and 3, a pair of molding portions 3L, 3R are disposed under a die head 1 of an extruder so as to freely open and close in a horizontal direction. The molding portions 3L, 3R are structured in such manner as to pinch with pressure a tube-shaped parison 2 which has been extruded between the molding portions 3L, 3R from the die head 1.

Since in the embodiment, the pair of molding portions 3L and 3R have the same construction in main portion thereof, so that only a structure of molding portion 3R is explained herein while leaving out the explanation about that of molding portion 3L.

Figure 2:
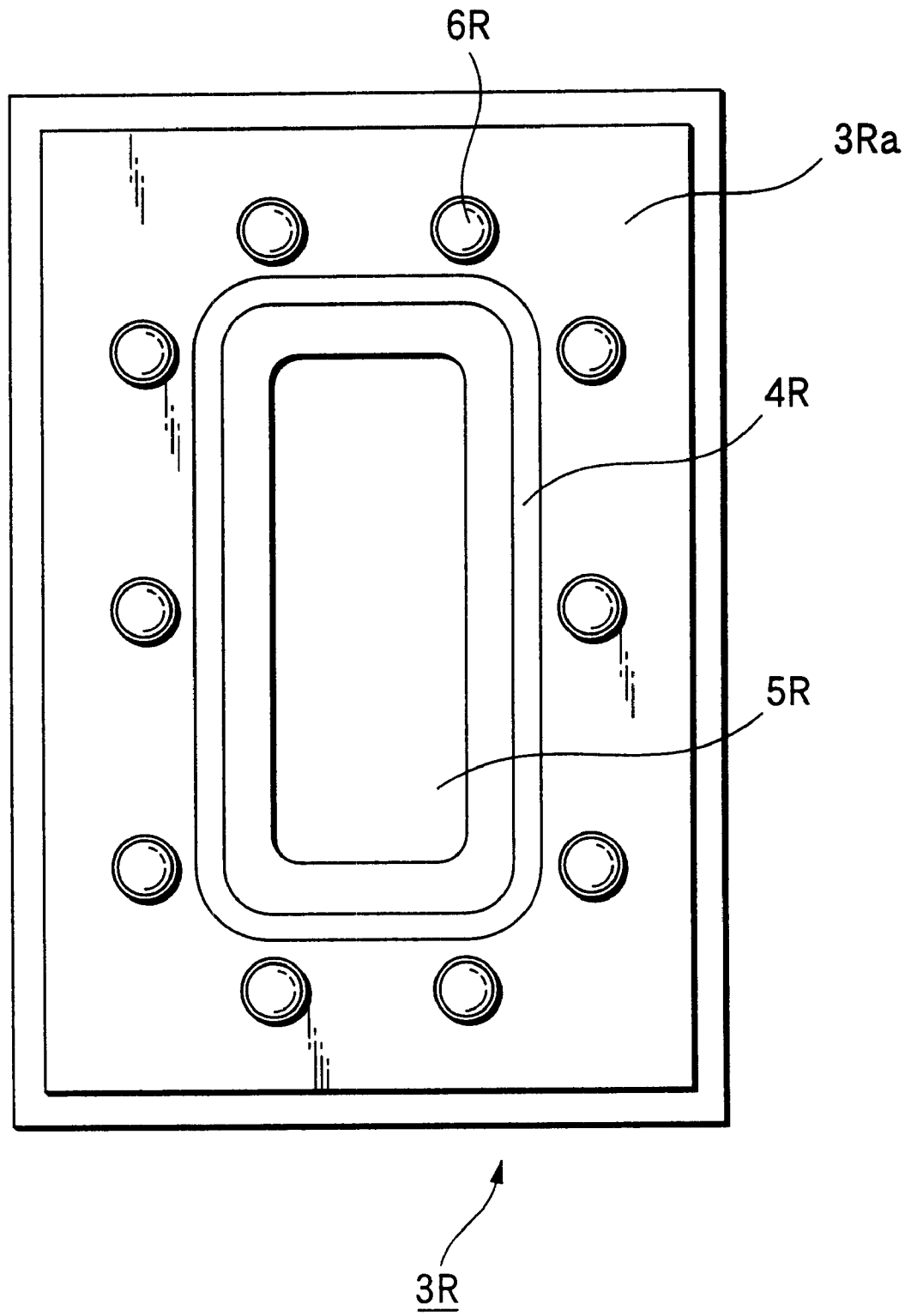
FIG. 2 is a front view showing the mating face of the metal mold.

As shown in FIG. 2, in molding portion 3R, an annular-shaped protrusion 4R for cutting the parison 2 is erected from a mating surface 3Ra of the molding portion 3R and extended along the periphery of the mating surface 3Ra. The annular-shaped protrusion 4R is shaped to narrow a bottom surface of a band-shaped depression 5R. In the vicinity of the edge portion of the molding portion 3, a plurality of confronting rods 6R, 6R . . . are disposed outside the protrusion 4R in the radial direction of the molding portion 3R. The confronting rods 6R, 6R . . . supports the molding portion 3R upon closing the molding portions 3R, 3L. The confronting rods 6R, 6R . . . are disposed at suitable intervals in the circumferential direction thereof.

Figure 5:
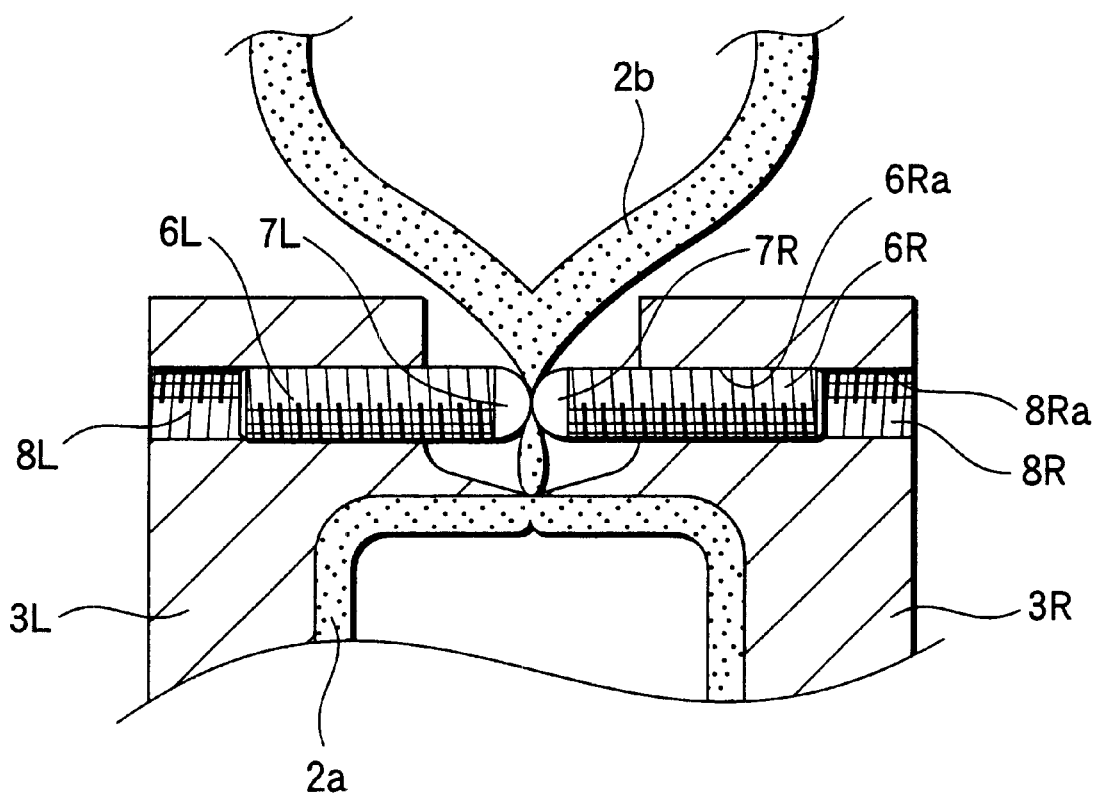
FIG. 5 is a partially enlarged sectional view of FIG. 3.

As shown in FIG. 5, the confronting rods 6R, 6R, . . . are threadedly engaged with openings 8R formed within a mating surface 3Ra of the molding portion 3R, respectively. Threaded portion 6Ra formed on the peripheral surface of the confronting rod 6R is inserted and threadedly engaged with screw portion 8Ra formed in the opening 8. A protruding length of each confronting rod 6R is adjustable by changing the threadedly contact position between the screw portion 8Ra and the threaded portion 6Ra of the confronting rod 6R. The length of the rods 6R protruded from the mating surface 3Ra is adjusted in such a manner that the tip portions 7R, 7L of confronting rods 6R, 6L are brought into contact with each other, in case of closing the molding portions 3R, 3L tightly. The confronting rods 6R, 6L are constructed so that they are adjustable in length protruded from the relative mating surfaces 3Ra, 3La through the above-mentioned screw engagement.

The blow molding method may include the step of adjusting the protruded length of the rods 6R and/or the rods 6L optionally, in such a manner that the rods 6R and 6L can be brought into contact with each other completely at the time of abutting the first and second parison cutting-protrusions.

With this structure confronting rods 6R, 6L are replaceable with new one without any difficulty, if damaged.

However, it is possible to modify such construction in such a manner that one is adjustable in length and the other is fixed in length.

Figure 6:
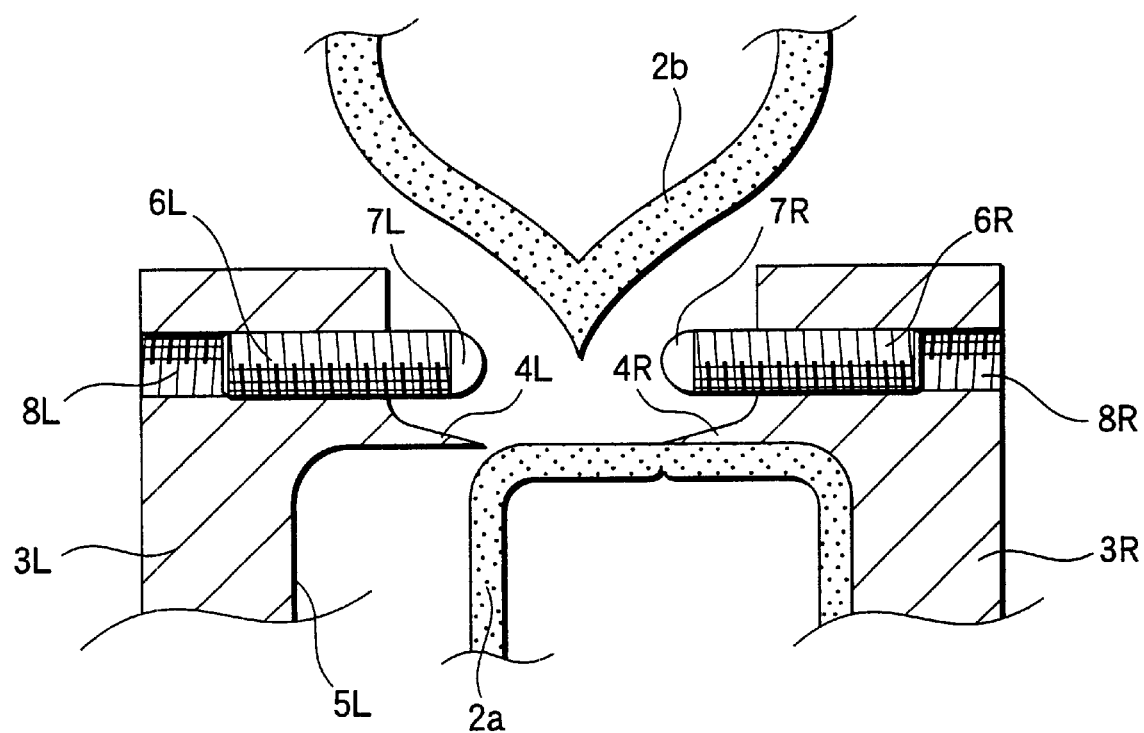
FIG. 6 is an enlarged sectional view showing the molding portion in an opening condition after blow molding.

In addition to this, as clearly shown in FIGS. 5 and 6, each of tip portion 7R, 7L of the confronting rods 6R, 6L has a spherical surface without a flat smooth surface.

Figure 4:
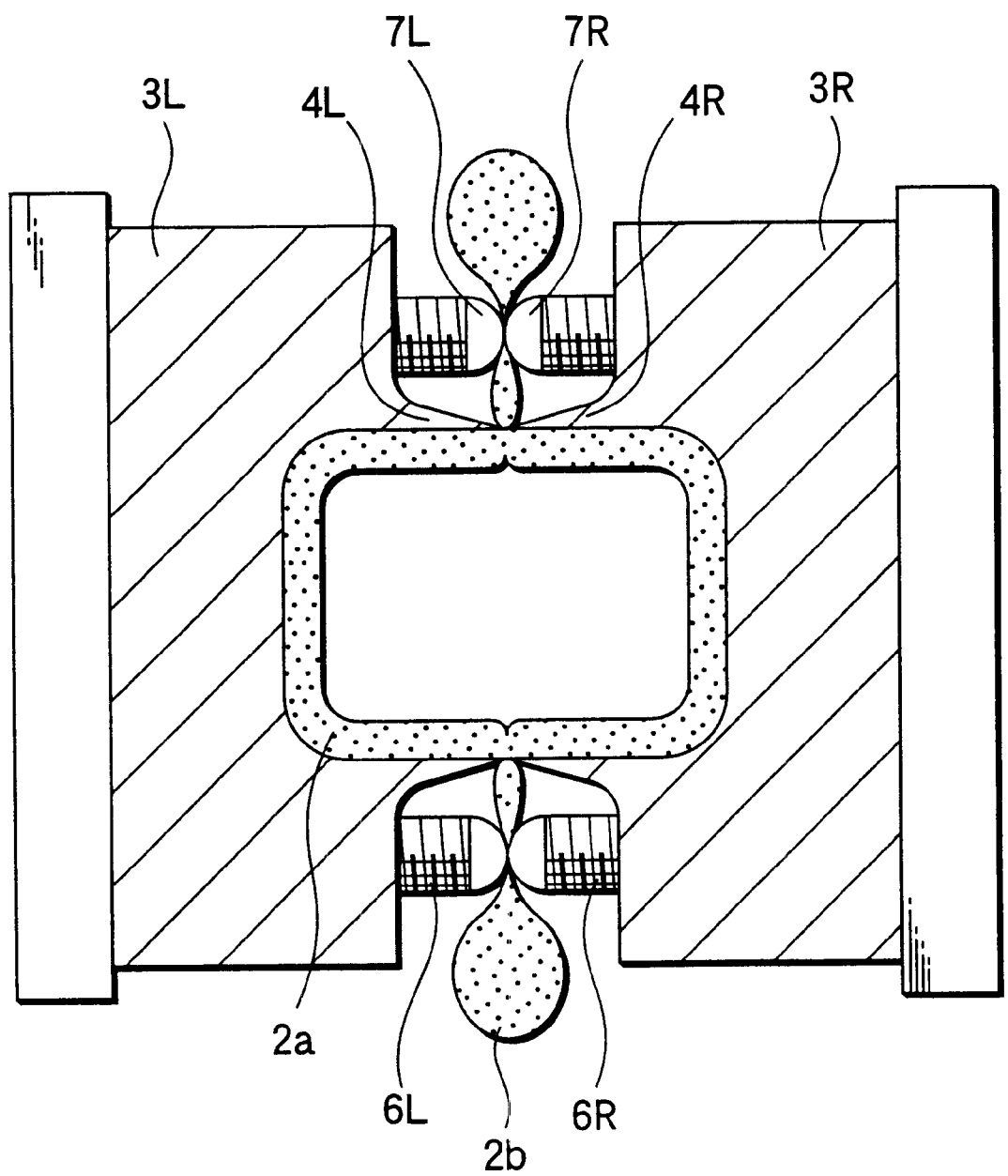
FIG. 4 is a sectional view of the molding portion taken along IV—IV line shown in FIG. 3.

With thus structure, the molding portions 3R, 3L pinch the tube-shaped parison 2 with pressure. Moreover, the high-pressure air is injected into the parison 2 when the molding portions 3R, 3L are closed in a molding portion closing condition. As shown in FIGS. 3 and 4, in the molding portion closing condition, the tip portions 7R, 7L of the confronting rods 6R, 6L are brought into contact with each other and at the same time the protrusions 4R, 4L of the molding portions 3R, 3L are also brought into contact with each other. Since each of the tip portions 7R, 7L thereof has a spherical surface, even if pressure-pinching parison 2 made of high-temperature molten resin, the parison 2 can be easily moved away from a position to be pinched so as to disperse the same along the spherical surface (as a curved surface thereof). Accordingly, thus the parison 2b is not pinched between the tip portions 7L, 7R and can be decoupling a product portion 2a with a flash 2b by the protrusions 4R, 4L. (See FIG. 5)

As shown in FIG. 6, a mold is opened after cooling and solidifying the product. A protruded pin (not shown) in the molding portion 3R pushes the product portion 2a which was decoupled completely with a flash 2b.

Hereinafter, another examples of the confronting rod will be explained with reference to FIGS. 7A and 7B.

Figure 7A:
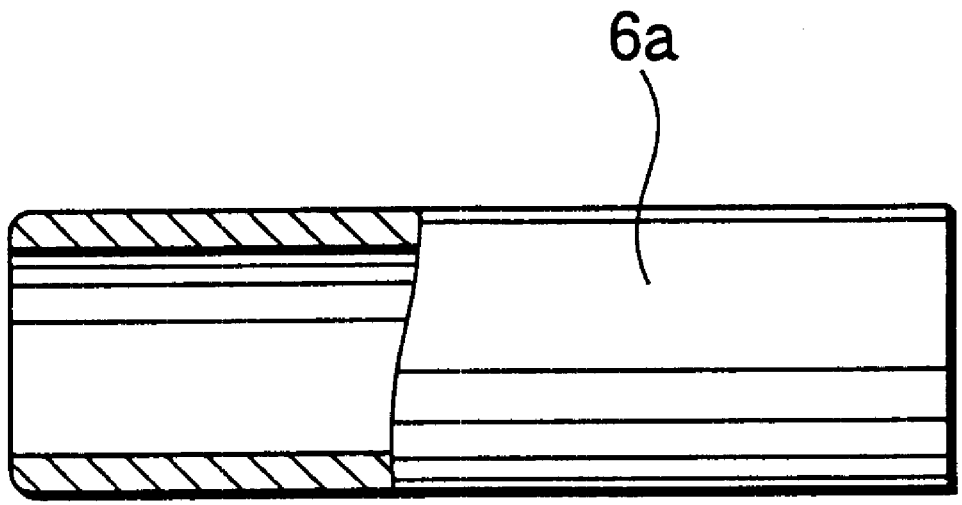
FIGS. 7A and 7B show another examples of the confronted rod according to the present invention.

FIG. 7A shows a pipe shaped confronting hollow rod 6a, which is replaceable with each of the solid-shaped confronting rods 6R, 6L according to the afore-mentioned embodiment.

Figure 7B:
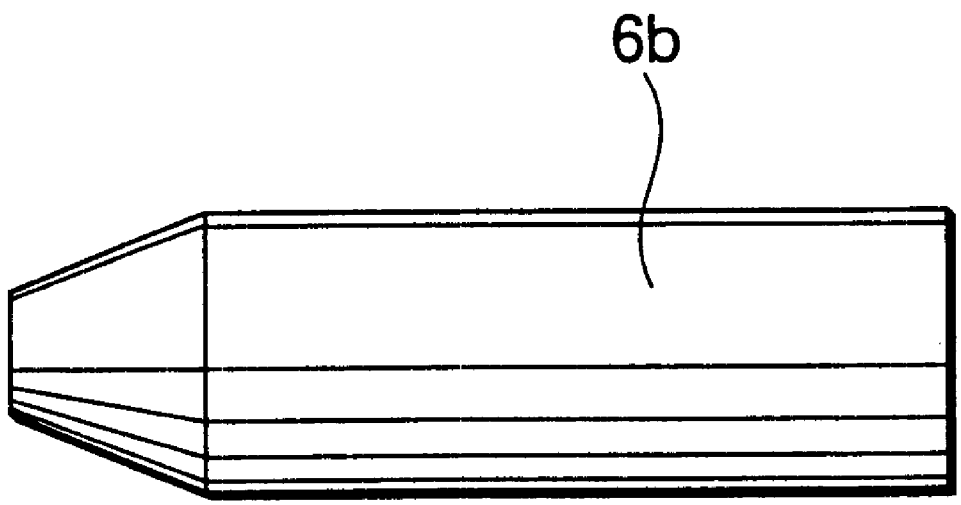

FIG. 7B shows a tapered confronting hollow rod 6b which has a narrow flat surface on its tip end, instead of the spherical surface in each of the solid-shaped confronting rods 6R, 6L according to the afore-mentioned embodiment. Size of the narrow flat surface can be determined in such a manner that the parison is not pinched therebetween substantially.

According to the present invention, when the molding portions are tightly closed, the parison can be decoupled with the flash around the product completely. Therefore, it is not necessary to take the flash away by hand, so that the productivity and operational safety increase.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A blow molding method for forming a hollow resin product, the method comprising the steps of:

Extruding a parison from a die head towards a position interposed between first and second molding portions, wherein said first molding portion has a first mating surface and a first annular-shaped parison-cutting-protrusion erected from said first mating surface, and said second molding portion has a second mating surface and a second annular-shaped parison-cutting-protrusion erected from said second mating surface;

abutting said first and second annular-shaped parison-cutting-protrusions while closing said first and second molding portions tightly, thereby defining a molding chamber by said first and second annular-shaped parison-cutting-protrusion; and abutting a plurality of first confronting rods with a plurality of second confronting rods respectively at the same time of the abutting step of the first and second annular-shaped parison-cutting-protrusions, wherein said first confronting rods are protruded from the first mating surface of the first molding portion and disposed outside said first annular-shaped parison-cutting-protrusion in a radial direction of said first molding portion, and said second confronting rods are protruded from the second mating surface of the second molding portion and disposed outside said second annular-shaped parison-cutting-protrusion in a radial direction of said second molding portion.

2. The blow molding method according to claim 1, further comprising the step of:

adjusting a length of at least one of first confronting rods, the length protruding from the first mating surface.

3. The blow molding method according to claim 2, further comprising the step of:

adjusting a length of at least one of second confronting rods, the length protruding from the second mating surface.

4. The blow molding method according to claim 1, wherein at least one of said first and second confronting rods has a spherical surface at its tip end.

5. The blow molding method according to claim 1, wherein at least one of said first and second confronting rods is a hollow pipe.

6. The blow molding method according to claim 1, wherein at least one of said first and second confronting rods has a taped portion at its tip end.

7. The blow molding method according to claim 6, wherein said taped portion has a flat surface at its tip end.

* * * * *